United States Patent [19]

Torii

[11] Patent Number: 4,712,911
[45] Date of Patent: Dec. 15, 1987

[54] EXPOSURE MASK FOR MICRO CAMERA

[75] Inventor: Hisatsugu Torii, Kanagawa, Japan

[73] Assignee: Fuji Photo Film Co., Ltd., Kanagawa, Japan

[21] Appl. No.: 881,970

[22] Filed: Jul. 3, 1986

[30] Foreign Application Priority Data

Jul. 3, 1985 [JP] Japan .................................. 60-146384

[51] Int. Cl.[4] .......................................... G03B 27/58
[52] U.S. Cl. .................................................. 355/74
[58] Field of Search ........................................ 355/74

[56] References Cited

U.S. PATENT DOCUMENTS 3,488,119 1/1970 Dixon et al. ........................... 355/74
4,236,817 12/1980 Hofstetter ............................. 355/74
4,240,744 12/1980 Rapp et al. ............................ 355/74

Primary Examiner—Monroe H. Hayes
Attorney, Agent, or Firm—Young & Thompson

[57] ABSTRACT

An exposure mask adapted to be used with a micro camera whose microfilming format is changeable, is provided with an exposure aperture defining the size of the frames of the micro images to be recorded on a film. The mask has at least one data exposure aperture outside the exposure aperture, and is provided with an information section which is either mechanically or photoelectrically detected by a detecting member in the micro camera in order to change completely the microfilming camera format of the micro camera in accordance with the type of the exposure mask.

4 Claims, 4 Drawing Figures

EXPOSURE MASK FOR MICRO CAMERA

BACKGROUND OF THE INVENTION

The present invention relates to exposure masks for use with micro cameras, and more particularly to exposure masks which can automatically set micro cameras to proper microfilming formats when mounted in the micro cameras.

For conserving storage space, it is a widespread practice to microfilm documents by means of micro cameras. The micro camera has a camera assembly or camera head including an exposure mechanism placed above a stationary table on which documents are placed in position to be microfilmed. In accordance with the types of documents, indexing mode of information contained in microfilm, etc., there are various standardized microfilming formats which are selectively adopted for the purposes of microfilming. The selection of suitable formats is made based on the size of the document-images on film, the necessity of recording data together with the document-images on film, the location of the data on the film, etc.

Micro cameras usually have a predetermined, unchangeable camera format for microfilming documents. This type of micro camera is, therefore, disadvantageous in applications wherein it is necessary to microfilm different types of documents in various formats by use of a single micro camera. If the size of the frames of the document images is made changeable by using various types of exposure masks, it is necessarily required to adjust the micro cameras so as to change the forwarding length of the film in accordance with the frame sizes in order to keep the distance between frames constant for all microfilms with different frame sizes and to change the location where the data associated with each document-image is to be recorded on film.

The micro camera described above has the disadvantage that it is difficult to embody the micro camera in a practical environment. In particular, micro cameras used heretofore are difficult to adjust manually.

OBJECTS OF THE INVENTION

It is, therefore, the principal object of the present invention to provide an exposure mask which is adapted to be interchangeably used with a micro camera whose microfilming camera format is changeable so as to establish a particular microfilming format in accordance with the type of exposure mask in the micro camera.

SUMMARY OF THE INVENTION

In accordance with the invention, there is provided an exposure mask formed with an exposure aperture for defining the size of the frames of the micro images to be recorded on a film and at least one aperture for determining the location of the data images to be recorded on the film outside the frames. There is also provided information means which is adapted to be detected by a micro camera when mounted therein in order to complete the adjustment of microfilming camera format in the micro camera in accordance with the type of the mounted exposure mask.

The microfilming formats depend on a combination of, for example, the frame sizes of the micro images, the presence of indexing data, and the location of the indexing data on the film. For this reason, there are preferably prepared as many exposure masks as possible combinations. When microfilming documents, a proper exposure mask selected according to a desired microfilming format is mounted in a micro camera having an information sensor. This sensor can detect the information of the exposure mask present, in order to automatically adjust, for example, the reduction ratio of a micro lens, the film forwarding length of a film winding mechanism, and a data recording optical system, etc.

In accordance with the present invention, it is permissible to use various forms of information means, for example jagged edges or surfaces, opaque segments or reflecting segments, which are detected respectively by micro switches, a transmitting type of photo-sensor or a reflection type of photo-sensor.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DETAILED DESCRIPTION OF THE INVENTION

Figure 1:
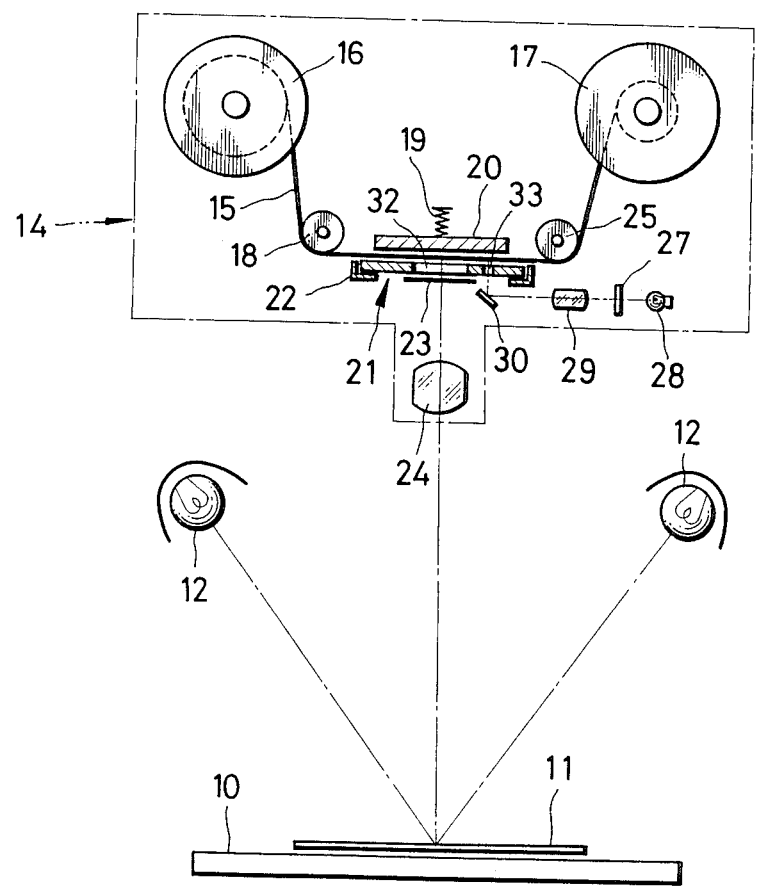
FIG. 1 is a schematic cross sectional view of a micro camera cooperating with an exposure mask according to an embodiment of the present invention.

Referring now to FIG. 1 showing an example of a micro camera for use with exposure masks in accordance with the present invention, there is a camera assembly 14 slidably mounted on a column (not shown) for vertical movement in a well known manner in order to vary reduction ratio.

An original document 11 on a stationary table 10 is placed in the field of view of the camera lens 24 and uniformly illuminated by illumination lamps 12, 12 at the upper right and left of the table 10. The illumination light from the lamps 12, 12 illuminates the document 11 and is reflected thereby. The reflected light is focused on a photographic film 15 by means of the objective taking lens 24 to create a latent image of the document 11 under the control of a shutter 23.

In the camera assembly 14, there are reels 16, 17 detachably mounted for film supplying the winding, respectively. The film 15 is withdrawn out from the film supply reel 16 and is wound up on the film winding reel 17 via guide rollers 18, 25.

At an exposure position, the film 15 is held flat between an exposure mask 21 with an opening 32 for defining an exposure aperture and a pressure plate 20 forced against the film and thence against the exposure mask 21 by the force of a compression spring 19. This exposure mask 21, which is the one selected in accordance with an intended microfilming format from several types of exposure masks as will be described in detail later, is removably inserted between a pair of supporting members 22.

Below the exposure mask 21 inserted between the supporting members 22, there is a shutter 23 for regulating the total quantity of light reaching the film 15 by controlling its opening time exactly. During the opening of the shutter 23, the light reflected from the document 11 is focused on the film 15 by means of the objective taking lens 24 passing through the exposure aperture 32 of the exposure mask 21, so as to create a latent micro image of the document 11. The film 15 thus exposed is then sent to a position where data corresponding to the intended microfilming format is recorded thereon through data exposure apertures (one of which is hidden in FIG. 1) which are defined by openings 33, 34 in the exposure mask 21.

The data such as blips used for indexing is provided by means of data display 27 which comprises, for example, liquid crystal display (LCD) panels adapted to be illuminated by an illumination lamp 28. The illumination light from the lamp 28 pass through the data display 27 and is then focused on the film 15 at its margin by a lens 29, after being reflected upwardly by a mirror 30 and then passing through the data exposure apertures 33, 34 of the exposure mask 21. For the data display 27, it is permissible, if desirable, to use a matrix arrangement of LEDs in place of the above-described LCD panel, which allows the omission of the illumination light source such as the lamp 28.

After having recorded the data on the film 15, it is wound up onto the reel 17. It is permissible to form the data exposure apertures in the exposure mask 21 either on the side adjacent to the film supply reel 16 or on both sides of the exposure aperture 32.

Figure 3:
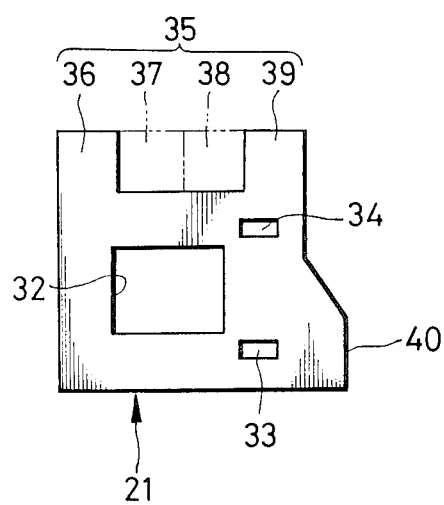
FIG. 3 is a plan view of the exposure mask of FIG. 2.
Figure 4:
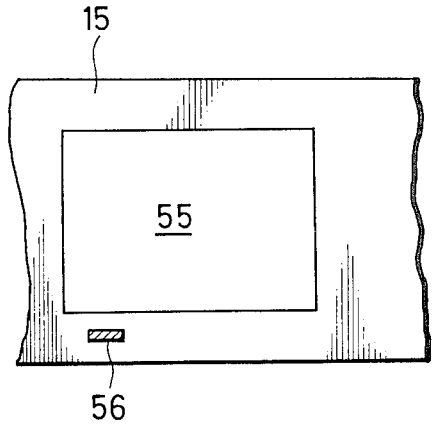
FIG. 4 is a fragmentary view of a microfilm on which micro images are recorded.

Reference is now had to FIG. 3 showing an example of the exposure mask in accordance with the present invention.

It should be noted that, in accordance with the present invention, there are prepared as many different types of exposure masks as the different kinds of microfilming formats which basically depend on several factors such as frame size, film forwarding length, data to be recorded, date recording location on film, etc. Such microfilming formats are selected according to the purposes for which microfilms are used.

The exposure mask 21 shown in FIG. 3, which is the one selected from the different types of exposure masks, is inserted into the supporting members 22 to cause the micro camera automatically to conform to the selected microfilming format. At this time, the exposure mask 21 can establish the frame size and the data location by itself, and gives to a control section of the camera assembly 14 signals for adjusting the other factors determining the microfilming format of the micro camera.

When inserted in the supporting members 22, the exposure mask 21 is disposed in such a position as to align the center of the exposure aperture 32 with the optical axis 13 of the objective lens 24, thereby defining the frame within which a micro image is recorded on film. Through the exposure aperture 32, the image forming light reflected from the document 11 reaches the film 15, so as to create a latent image of the document thereon. The exposure mask 21 is also formed, on the side adjacent to the wind-up reel 17 and spaced from both transverse side edges of the exposure aperture 32 in the direction of insertion, with the data exposure apertures 33, 34 through which it is possible to record blips on the film 15 for the purpose of indexing. Specifically, the blips are recorded on the film 15 along its lower margin through the data exposure aperture 33 or along its upper margin through the other aperture 34.

In the exposure mask 21 there is provided an information section 35 which indicates the type of the exposure mask 21. This information section 35, when the exposure mask 21 is inserted, automatically sets the micro camera to the microfilming format peculiar to the exposure mask 21. The information section 35 consists, in this embodiment, of up to four opaque segments 36 to 39 which in turn serve as a four-bit signal for distinguishing one exposure mask 21 from the other. The exposure mask 21 is also provided, on its one side, with a laterally projecting cam member 40 which can move the data recording optical arrangement to a position where the data exposure apertures 33, 34 intersect the optical axis of the lens 29 when the exposure mask 21 is inserted.

Figure 2:
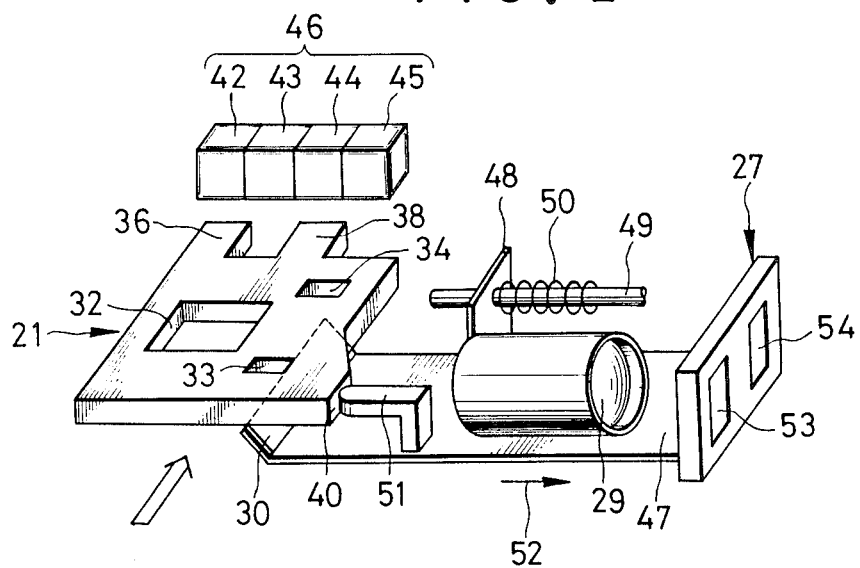
FIG. 2 is a schematic, perspective view showing the principal elements of the micro camera with exposure mask of FIG. 1.

Reference is now had to FIG. 2 showing the exposure mask 21 in use. When the exposure mask 21 is inserted in the camera assembly 14 in the direction of the arrow shown in FIG. 2, an information detecting section 46 consisting of four photosensors 42 to 45 of a light-transmitting type detects the opaque segments 36, 38 to provide a four-bit signal which is transmitted to a control section (not shown) of the camera assembly 14. Below the inserted exposure mask 21, there is a movable plate 47 on which the above-mentioned data display 27, lens 29 and mirror 30 are mounted. The movable plate 47 is provided with a bracket 48 having a guide rod 49 fixed thereto. The movable plate 47 is urged in the left hand direction by a compression spring 50 wound around the guide rod 49 but is moved to the right when a bent arm 51 secured to the movable plate is pushed by the cam member 40 when the exposure mask is inserted. As a result, the data recording optical system is automatically placed in the proper position relative to the data exposure apertures 33, 34. The data display 27 includes a pair of LCD panels 53, 54 for upper and lower blips which panels are selectively activated in accordance with microfilming formats.

A further understanding of the function of the exposure mask of the invention will be had from the following description.

First, the exposure mask 21 is selected, which is the one which complies with an intended microfilming format. The selected mask is then inserted in the supporting member 22. Upon the insertion of the exposure mask 21, the cam member 40 pushes the bent arm 51 in the right hand direction, so as to displace the movable plate 47 in the direction shown by an arrow 52 in FIG. 2 against the force of the compression spring 50, thereby properly positioning the data recording optical system. Simultaneously, the information detector 46 in the camera assembly 14 detects the microfilming information of the information section 35 comprising two opaque segments 36, 38 and provides a four-bit format signal which in turn is transmitted to the camera control section for adjusting the reduction ratio for document images corresponding to the frame size defined by the exposure aperture 32 of the exposure mask 21, the film forwarding length of the film winding mechanism, etc.

When operating a start key for microfilming, the shutter 23 is opened for a predetermined time to allow the reflected image-forming light from the document 11 to pass through the exposure aperture 32 and reach the film 15, thereby recording a document image within the frame 55 defined by the exposure aperture 32 of the exposure mask 21. After having recorded the document image, the film 15 is forwarded by a length which has been determined in accordance with the information contained in the information section 35 of the exposure mask 21, thereby positioning the film 15 so as to locate the data exposure apertures 33, 34 on the sides of the exposure frame 55. Then one of the LCD panels 53, 54, for example the panel 53 in the illustrated embodiment, is selectively driven in order to record a blip 56 on the lower marginal portion of the film 15. The selection of the LCD panels is effected in accordance with the information contained in the information section 35 of the exposure mask 21. When the data recording is completed, the film 15 is wound up by the reel 17. At this time, the reel 17 is controlled to rotate through a certain angle so as to wind the film 15 by a length predetermined by the information contained in the information section 35 of the exposure mask 21.

What is claimed is:

1. An exposure mask adapted to be interchangeably used with a micro camera whose microfilming format is changeable, said exposure mask having an exposure aperture for defining the size of frames of micro images to be recorded on a photographic film and at least one aperture outside the exposure aperture and which is adapted to allow data images to be projected there through to be recorded on said photographic film outside said frames, said mask having means containing mask-type information adapted to be detected by said micro camera in order to effect the changing of the microfilming format of said micro camera in accordance with the type of said exposure mask, said information-containing means comprising a plurality of opaque segments adapted to be detected by means of a photoelectric sensor in said micro camera, the arrangement of said opaque segments being unique to one type of exposure mask.

2. An exposure mask as defined in claim 1, wherein two said data apertures are formed on opposite sides of said exposure aperture.

3. An exposure mask as defined in claim 1, further having cam means for automatically positioning an optical system for recording data images.

4. An exposure mask as defined in claim 1, wherein said information-containing means contains information as to the reduction ratio for documents to be microfilmed on said photographic film and as to the length by which said photographic film is forwarded every exposure.

* * * * *